May 31, 1966 J. BAUMOEL 3,254,333
LIQUID CONDITION AND LEVEL DETECTOR
Filed Jan. 14, 1963 2 Sheets-Sheet 1
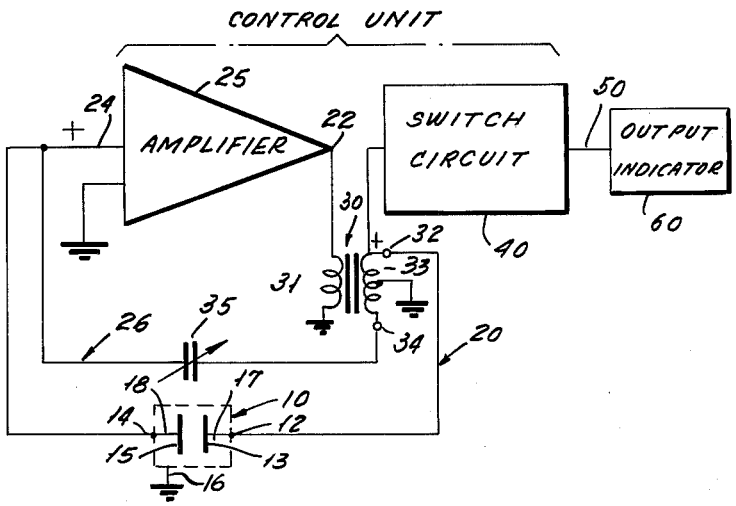
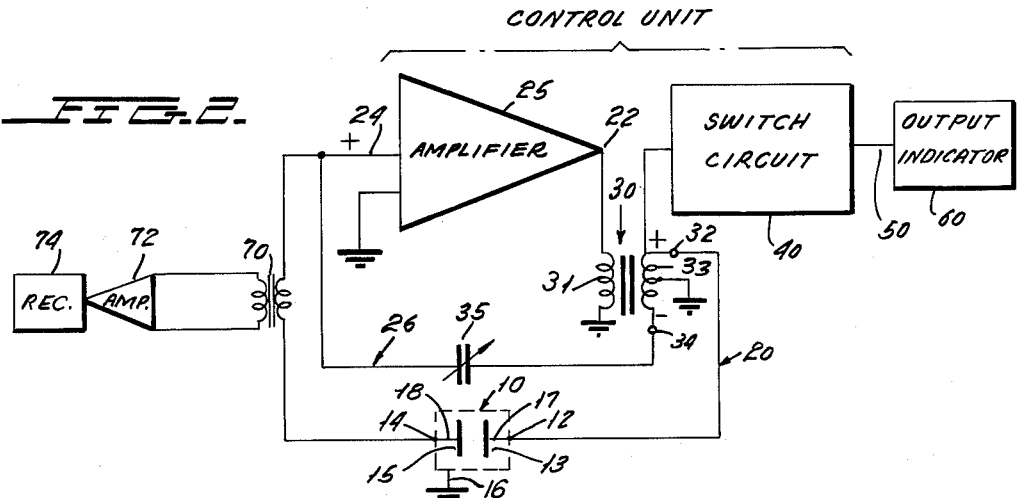
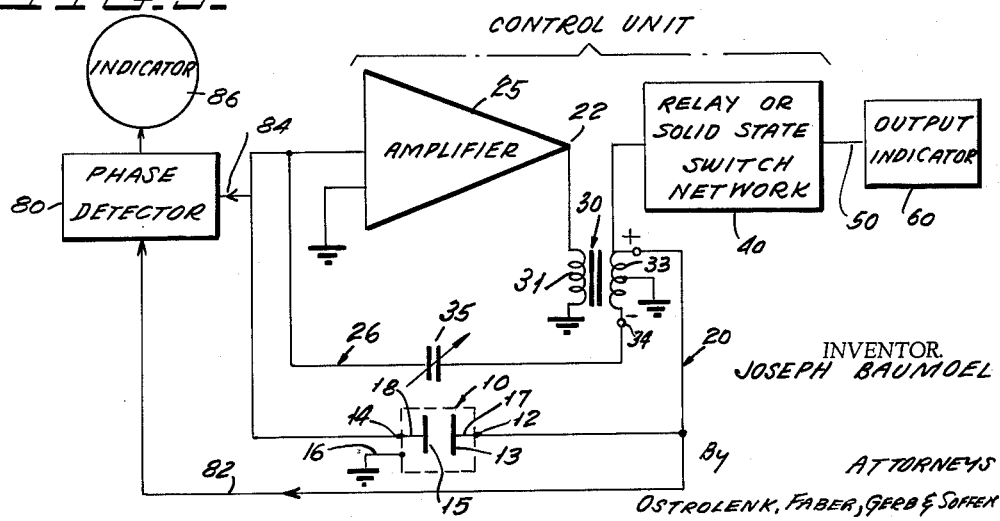
INVENTOR.
JOSEPH BAUMOEL
ATTORNEYS
OSTROLENK, FABER, GERB & SOFFEN May 31, 1966 J. BAUMOEL 3,254,333
LIQUID CONDITION AND LEVEL DETECTOR
Filed Jan. 14, 1963 2 Sheets-Sheet 2

INVENTOR.
JOSEPH BAUMOEL
BY
OSTROLENK, FABER, GERB & SOFFEN
ATTORNEYS

United States Patent Office 3,254,333
Patented May 31, 1966

3,254,333
LIQUID CONDITION AND LEVEL DETECTOR
Joseph Baumoel, 107 Columbia Drive, Jericho, N.Y.
Filed Jan. 14, 1963, Ser. No. 251,170
9 Claims. (Cl. 340—244)

This invention relates to an electrical apparatus for the detection and analysis of fluids in terms of their electrical properties. More particularly, it includes a sensing probe and cooperating control circuitry to generate an output indication responsive to the impedance variation effected by the presence or absence of fluid at the probe. The fluid may for example be a liquid, such as a hydrocarbon fuel. Alternatively the fluid may be a granulated or powdered solid that may be caused to flow about the probe elements.

It is known to measure the level or properties of a fluid by positioning an electrical sensing probe within the fluid containing vessel, tank or pipe line. It is further known that various fluids have different electrical parameters, permitting them to be distinguished. As for example, the dielectric constant of air is approximately 1; that of water is 81; and the dielectric constant of many petroleum products is in the general order of 2 to 3. The resistivity of many fluids show similar variations. Thus the use of a probe in proximity to the fluid permits accurate determination of both fluid level and composition by the measurement of the impedance variation between spaced electrodes caused by the fluid therebetween.

It has heretofore been the practice of circuit connecting the probe element into a variety of critically balanced bridge arrangements, the bridge having a source of high frequency oscillations applied across opposite terminals thereof. Accordingly, a variation in the probe arm of the bridge effects an impedance unbalance producing a signal which is then applied to an indicating or recording apparatus. This method disadvantageously requires a continuous source of high frequency oscillations to be applied to the bridge circuitry, thereby imposing considerable power source requirements. Further, the output signal obtained from the bridge is generally proportional to the degree of unbalance, which relationship serves to limit the output signal magnitude.

Other arrangements have been practiced of including the sensing probe within the resonant tank circuit of a crystal controlled oscillator. The variation in the impedance of the probe modifies the resonant frequency of the tank circuit to either permit or prevent high level oscillations. Although such a system may provide increased sensitivity over the oscillator fed bridge technique, its most advantageous operation is obtained when the circuitry is switched from a continuously oscillating condition to a non-oscillating condition. Hence, such an "on-off" type device also requires the continuous dissipation of considerable amounts of power. Further, the successful operation of such systems has been found to be critically related to the amplifier gain and input impedance, thereby limiting their practicability.

My invention avoids the limitations of the prior art by including the sensing probe in one of two feedback paths provided between the output and input terminals of a conventional type amplifying circuit. The oppositely phased feedback signals may preferably be obtained from the end terminals of a transformer provided at the amplifier output. The feedback paths are arranged to present oppositely phased signals to the amplifier input such that a net zero feedback signal is combinedly fed to the amplifier input corresponding to a predetermined fluid condition at the sensing probe. The term zero net feedback signal is to be used throughout and is understood to mean a signal of zero or of a negative amount. The provision of such a negative feedback signal prevents a false indication should a small amount of fluid remain in the probe from previous operation. In one illustrative embodiment of my invention the feedback path which includes the probe presents a positive feedback signal to the amplifier input terminals. The other feedback path presents a negative feedback signal to the amplifier input terminals. The impedances within the respective feedback paths are appropriately matched such that when the probe contains air or any other medium of the fluid-containing vessel between its plates, the above-described condition of zero net feedback signal is obtained. Upon the air within the probe being displaced by the fluid, the impedance change between the probe terminal effects an unbalance between the feedback paths to thereby provide a net positive feedback signal to the amplifier input terminals. The application of such a positive feedback signal causes the amplifier to be rapidly switched to its oscillating condition. A high level output signal is then obtained, which output signal may then be presented to a variety of suitable indicating devices.

As an alternative embodiment of my invention the feedback paths may be matched such that the zero net feedback signal will be presented to the amplifier input only under those conditions wherein the probe is immersed in the fluid. Accordingly, variation in liquid level such that the fluid is no longer contained within the probe will then provide a net positive feedback signal to induce oscillation of the amplifying circuit.

As a particularly advantageous aspect of my invention, a fairly high gain amplifier circuit may be employed. The oppositely phased feedback paths serve to switch such an amplifier between its non-oscillating and oscillating condition, to thereby provide an "on-off" type device which is not critically dependent on amplifier gain or impedance levels. Further, my invention provides improved sensitivity over the previous systems in a considerably less costly, less complex and trouble-free arrangement than has heretofore been realized. Accordingly, such an arrangement lends itself to be packaged within a compact area, preferably located within the probe housing to thereby provide an integral assembly which may be directly located within the walls of the fluid containing tank. Such positioning of the control circuitry in direct proximity to the sensing probe preferably avoids sensitivity loss due to cable loading.

As a further advantageous feature of my invention, the amplifier, when switched to its oscillating condition, tends to oscillate at its saturation amplitude, thereby providing a substantially constant amplitude source of high level oscillation. Further, the magnitude of the impedance variation within the probe is proportional to both the level of fluid entering the probe and the type of fluid within the probe. This permits a fairly simple indication of either of these parameters by the inclusion of a current sensing tap-off within the feedback line. That is, since the amplitude of the signal presented to the feedback path will be substantially constant during all conditions of oscillation, the variation in probe impedance will effect a corresponding variation in feedback current. Accordingly, the feedback current magnitude may be calibrated to give a continuous reading of liquid level. Alternatively, with a known level of fluid within the probe, the current may be calibrated to indicate dielectric constant or resistivity of the fluid.

Further, the nature of the fluid under test may be determined by a phase detector connected to the opposite sides of the probe element. The phase differential between the signals at these points is related to the probe impedance, which in turn results from the properties of the fluid. Such a phase detector may provide a direct indication of fluid dielectric constant or resistivity.

As a further feature of my invention, the minimum power supply requirements and substantial simplicity in the electrical circuitry permits the components to be compactly contained between a longitudinally separated pair of disc-like planar members with such planar members providing the sole support of the electrical components contained in the control circuitry system. This assembly may then be potted for appropriate environmental protection and the integral unit inserted in an exteriorly accessible recess of the probe housing.

A variety of indicating devices may be alternatively connected to the output of the amplifier-oscillator. For example, a light may be provided in conjunction with the control system and located at the outermost region of the probe housing. Alternatively, the output signals of the control system may be used to actuate an alarm. The signal may also be transmitted to a remote location to cooperate with a centralized supervisory control system. Where it is desired to transmit the signal to such a remote location, the circuitry located at the probe installation may preferably include an antenna element to directly transmit the output indication to such a remote location.

It is therefore seen that the basic concept of my invention resides in including a negative and feedback loop in an amplifier circuit, with one of said feedback loops including a fluid sensing probe. The impedances of the loops are matched such that a zero net feedback signal is combinedly obtained corresponding to a predetermined condition of fluid presence, and a net positive feedback signal is obtained corresponding to another condition of fluid presence; the latter condition causing the amplifier to oscillate at its saturation level. Accordingly, increased dynamic range is obtained in a substantially simplified manner while avoiding the critical circuit arrangements of the prior art.

It is accordingly a primary object of my invention to provide a high sensitivity system for detecting fluid level.

It is a further object of my invention to provide a fluid detection system which includes negative and positive feedback paths intermediate the output and input terminals of an amplifier circuit, with one of the feedback paths including a sensing probe.

Another object of my invention is to provide a liquid detecting system which includes a high gain amplifier circuit rapidly switched between a non-oscillating and an oscillating condition responsive to the change of a predetermined condition of fluid presence.

An additional object of my invention is to provide such a system wherein the amplifier circuit when in its oscillating condition provides a substantially constant amplitude source of high level oscillations.

Still a further object of my invention is to provide such a fluid detecting system which further includes feedback path current or phase sensing means to determine the properties or continuous level of the fluid contained within the sensing probe.

Still another object of my invention is to provide a fluid detection system which includes an integral assembly of a sensing probe and control circuitry thereof; the integral assembly being compactly assembled to be directly installed within the wall surface of a fluid containing tank.

These as well as other objects of my invention will readily become apparent upon reading the following description of the accompanying drawings in which:

FIGURE 1 is a simplified schematic illustrating the basic operation of a system constructed in accordance with the novel teachings of my invention.

FIGURE 2 is a further modification of the system shown in FIGURE 1 which includes a current sensing means for continuous fluid level recording.

FIGURE 3 is a further modification of the systems shown in FIGURE 1, which further includes a phase detector for obtaining additional information regarding the fluid constituency.

Figure 4:
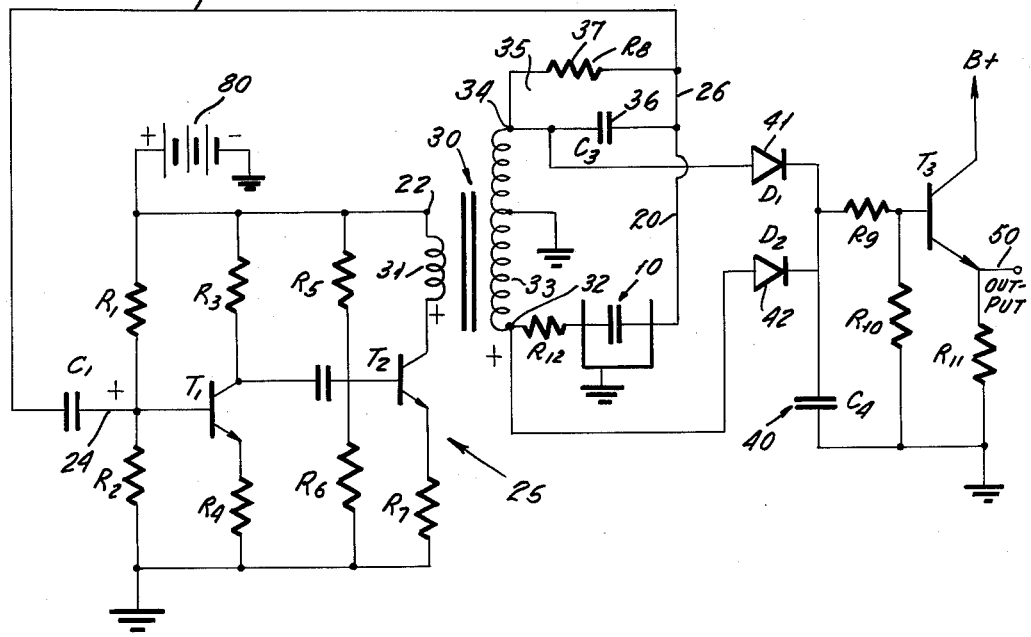
FIGURE 4 is an electrical schematic of a system constructed in accordance with FIGURE 1.

Reference is now made to FIGURE 1 which illustrates the basic principle of operation of my invention. Sensing probe assembly 10 may be a parallel plate probe, or formed of concentric cylindrical elements, of the general type shown in FIGURES 5 and 6. Probe assembly 10 formed of concentric cylindrical elements, of the general is preferably a three terminal device with the impedance between terminals 12 and 14 being dependent upon the material intermediate oppositely disposed elements 13, 15. The third terminal 16 is a circuit ground line or housing which advantageously may be provided to act as a shield. When the plates 13, 15 of the probe element are to be used in conjunction with a corrosive fluid, a thin layer of insulation material (not shown) such as Teflon or porcelain enamel may be provided to prevent corrosion of the probe elements and to reduce ground currents.

Sensing probe 10 is series connected in feedback path 20 provided intermediate the output terminal 22 and input terminal 24 of amplifier circuit 25. Another feedback path 26 is also shown connected intermediate the output and input terminals 22–24 of the amplifier circuit 25. Feedback paths 20 and 26 are appropriately fed as by terminals 32, 34 of output transformer 30 to provide oppositely phased signals to the amplifier input terminal 24. An impedance element 35, illustratively shown as an adjustable capacitor, is shown included in feedback path 26. The impedance of element 35 is appropriately matched to that of sensing probe 10 such that the combined feedback signal of paths 20 and 26 will be of zero magnitude corresponding to a predetermined condition of liquid presence at probe element 10. For example, when the fluid level is below probe 10 such that air is contained intermediate elements 13 and 15, the impedance of feedback paths 20, 26 may be matched to provide such a net zero feedback signal. When fluid flows intermediate elements 13 and 15, the impedance of probe 10 will accordingly vary to effect a net positive feedback signal at input terminal 24, thereby causing amplifier 25 to go into oscillation.

Amplifier 25 is preferably a high gain circuit, appropriately designed not to go into oscillation until a desired net positive feedback signal is presented at its input 24. This preferably provides high sensitivity of operation; that is, a small impedance change at the sensing probe 10 provides "on-off" switching of a high level of oscillation. Such impedance change may be significantly less than the overall impedance of probe 10. Thus, the system may be designed to permit partial filling of a fairly small sensing probe 10 to initiate such oscillation.

As an alternative embodiment the connections of impedance members 10 and 35 to transformer 30 may be reversed to provide a net zero or negative feedback signal when the area intermediate plates 13, 15 is filled with the fluid. Accordingly, the removal of the fluid, corresponding to a lowering of the fluid level, will effect a net positive feedback signal and accordingly initial oscillation of amplifier 25. Hence, it is seen that the basic dual feedback path concept shown in FIGURE 1 is equally adaptable to provide high sensitivity for both the presence and removal of the fluid at the probe element 10.

A particular advantage of the self-oscillating mode of operation of my invention is that the output signal is either of substantially zero magnitude or a comparatively constant amplitude source of high level oscillation. Such a constant high level signal is obtained by proper design of the amplifier 25 circuitry to cause oscillation at or near its saturation level. Further, since the amplifier itself is switched between an "on and off" condition, the power requirements are substantially lower than those prior art devices which required a constant source of high level oscillations.

The availability of a substantially constant amplitude signal at the amplifier output corresponding to the activated condition of the control circuit permits the basic system of FIGURE 1 to be easily adapted to provide continuous level indication, as shown in FIGURE 2. When operating in conjunction with a known fluid, the degree to which the impedance of probe element 10 will be varied is proportional to the degree of immersion of the probe within such fluid. Accordingly, the system may be designed to initiate oscillation corresponding to only partial filling of the probe. As the probe continues to fill, corresponding to increased fluid level, the output signal amplitude at terminal 32 of the amplifier will remain substantially constant. However, since the impedance of probe element 10 will continue to vary, a current variation will be effected within feedback path 20. An appropriate current tap-off device 70 is provided to present a signal to amplifier 72 proportionally related to the magnitude of current flow within feedback 20. The output of amplifier 72 may then be presented to an appropriate recorder 74, to yield a continuous indication of fluid level.

As a further feature of my system, a conventional phase detector 80 may be provided as shown in FIGURE 3, to provide additional information regarding the properties of the fluid within the probe 10. That is, assuming probe 10 is full, the capacitive or resistive variation between terminals 12 and 14 will be dependent upon the dielectric constant or resistivity of the particular fluid. Such impedance variation may be determined b ycomparing the phase presented to lines 82, 84, at the opposite ends of probe unit 10. The phase detector output may then be presented to a suitable indicator 86, calibrated in terms of dielectric constant or resistivity.

To obtain an output indication of oscillator actuation, the output of amplifier 25 is applied to any of a plurality of indicating means. A relay or solid state switch 40, appropriately designed to transfer between an opened and closed position corresponding to the initiation of oscillator response, may also be included. The output of relay 40 is presented to an indicator 60 such as a light, alarm, bell, etc. Alternatively, the output of the control unit may be transmitted to a supervisory control unit (not shown) at a remote location. Such transmission may preferably be obtained by an antenna element located at the probe installation and within the integral assembly of the probe 10 and control unit circuitry.

Reference is now made to FIGURE 4, which shows a typical circuit which may be employed in a liquid detection system as shown in FIGURE 1. This system is designed to detect the presence of a substantially capacitive fluid and may, for example, operate at 100 kilocycles. The operating frequency of the system is selected upon a consideration of such factors as probe 10 impedance with relation to the input impedance of the amplifier 25; the magnetic inductance of the output transformer 30; and the phase shift through the feedback network of paths 20, 26. I have found particularly favorable results by operating at approximately 100 kc. Further, wherein it is desired to operate the system in conjunction with a remotely situated supervisory control system, a higher frequency, such as in the order of 500 kcs., may be employed to transmit the signal via an antenna element located at the probe installation.

The operation of amplifier circuit 25 is conventional and include transistors T1 and T2 forming a two-stage amplifier appropriately biased by B+ supply battery 80 to provide high gain amplification between input terminal 24 and output terminal 22. The output signal of amplifier circuit 25 is presented to the primary winding 31 of transformer 30, where it is then magnetically coupled to grounded center tapped secondary winding 33, having the oppositely phased terminals 32, 34. Terminal 32 feeds feedback path 20 containing probe sensing assembly 10. Terminal 34 feeds feedback path 26 containing the matching impedance 35, shown as including individual capacitive and resistive members 36, 37 respectively. Feedback paths 20, 26 combine at line 27 to effect a net feedback signal obtained by their additive oppositely phased individual signals and presented to amplifier input 24 via blocking capacitor $C_1$. The amplifier output obtained from terminals 32, 34 is also shown connected to solid state switching device 40 via rectifying diode elements D1, D2. The switch cricuitry 40 is preferably solid state and is shown including a transistor T3 also appropriately biased by battery 80 to be switched between a non-conducting and conducting condition. The output signal of solid state relay 40 will be of either one or two levels; a substantially zero level corresponding to the non-oscillating condition of amplifier 25, and a considerably higher level corresponding to amplifier 25 being in an oscillating state.

Without thereby limiting the scope of the invention, there are given below data of typical parameters which may be employed in the circuitry shown in FIGURE 4.

| Component | Value |
|---|---|
| T1 and T2 | 2N336 transistors. |
| T3 | 2N656 transistor. |
| R1 | 1.2 meg. |
| R2 | 150K. |
| R3 | 13K. |
| R4 | 1K. |
| R5 | 560K. |
| R6 | 27K. |
| R7 | 180 ohms. |
| R8 | 1.2 meg. |
| R9 | 10K. |
| R10 | 100K. |
| R11 | 8K. |
| R12 | 220. |
| C1 and C2 | 500 $\mu\mu f$. |
| C3 | 6 $\mu\mu f$. |
| C4 | 3300 $\mu\mu f$. |
| D1 | IN 459. |
| D2 | IN 459. |

Figure 5:
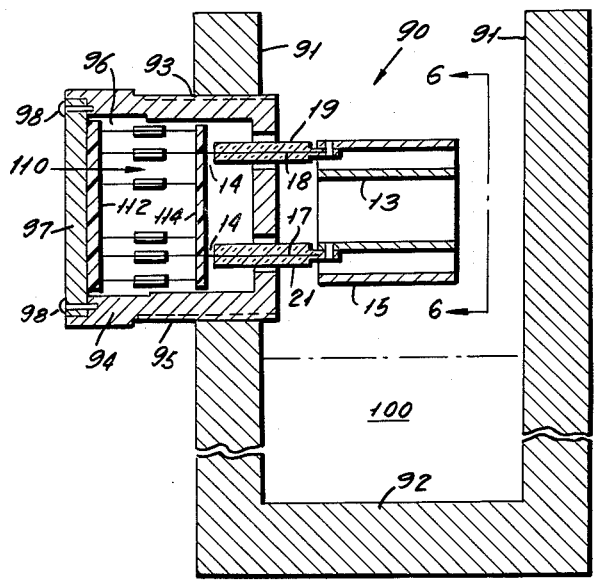
FIGURE 5 illustrates a typical integral assembly of the probe and control system circuitry shown installed in a tank wall.
Figure 6:
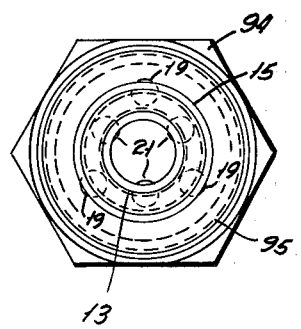
FIGURE 6 is an end view of the probe assembly looking in the direction of arrows 6—6.

Reference is now made to FIGURES 5, 6 which show a particularly advantageous integral assembly of the probe assembly and control circuitry within a common housing. Probe assembly 10 is adapted to be contained within threaded opening 93 of tank wall 91. The probe assembly 10 includes an exterior housing section 94 which may be formed of stainless steel. Housing 94 is threaded at 95 to mate with the opening 93 of the tank wall. The probe is formed of concentric tubular members 13, 15 open ended to permit entry of the fluid 100. The temperature coefficient of such a concentric probe is quite low. However, should it be desired to include further temperature compensation, this may be provided by including one or more temperature compensating components in the circuitry shown in FIGURE 4. By locating such circuitry in proximity to the probe elements at the fluid tank, such circuitry will be maintained at substantially the same temperature as the probe and fluid. Electrical connection is made between concentric plates 13, 15 and the control circuitry assembly, generally shown as 110, via conductors 17, 18 located within fused glass insulators 19, 21 respectively. Housing 94 is hollowed at its exterior region to form recess 96 of a suitable configuration to snugly contain the control system circuitry assembly 110. An end cap 97 is appropriately secured to the end portion of the housing unit by screws 98. End plate 97 may be adapted to include a visual indicator, such as a light, or an antenna element (not shown) to provide an output indication at such times as amplifier 25 is in an oscillating condition.

The control system is preferably circuitry supported between wafer-like end plates 112, 114, with such end plates being the sole means of support of the individual electrical components. The cylindrical-like assembly 110 of the circuitry may be appropriately potted or otherwise hermetically sealed for environmental protection.

It is thus seen that I have provided an improved liquid detection system by providing oppositely phased impedance matched feedback paths in conjunction with a high gain amplifier and a liquid sensing probe. The probe is contained in one of the feedback paths, such that a zero net feedback signal will be provided corresponding to a predetermined condition, with variation from this condition providing a net positive feedback signal to initiate high level oscillation of the amplifier circuit.

In the foregoing, my invention has been described in conjunction with preferred illustrative embodiments. Since many variations and modifications will now become obvious to those skilled in the art, I prefer therefore not to be bound by the specific disclosure herein contained but only by the appended claims.

I claim:

1. Electrical measuring apparatus comprising, in combination, sensing means adapted to be positioned within a fluid, the presence of which is to be determined; amplifying means including input and output terminals; a first feedback path including said sensing means; a second feedback path; said first and second feedback paths circuit connected intermediate said amplifier output and input terminals to combinedly present oppositely phased feedback signals to said amplifier input terminals; said feedback signals presented by said first and second feedback paths cancelling to present a substantially zero net feedback signal corresponding to a first predetermined condition of fluid presence at said sensing means, whereby said amplifying means will be in a non-oscillating condition; variation of said condition of fluid presence to a second predetermined condition effecting the electrical characteristics of said sensing means to present a net positive feedback signal to said amplifier input terminals, whereby said amplifying means will be in an oscillating condition; said second predetermined condition lying within a predetermined range of fluid conditions; said amplifier means when in said oscillating condition being near its saturation level, thereby providing a substantially constant amplitude source of oscillation responsive to any of a plurality of fluid conditions within said predetermined range; said amplifier means maintaining said substantially constant amplitude source of oscillation responsive to variations of said second condition of fluid presence lying within said predetermined range; fluid condition sensing means for determining the particular fluid condition within said predetermined range; said fluid condition sensing means operating in conjunction with said oscillating amplifier means, whereby said oscillating amplifier means provides a substantially constant amplitude first signal for indicating the presence of a fluid condition within said predetermined range and said fluid sensing means provides a second signal for indicating the particular fluid condition within said predetermined range.

2. The electrical measuring apparatus of claim 1; said sensing means comprising a pair of spaced electrodes; a pair of terminal means electrically connected to said pair of spaced electrodes; said predetermined range corresponding to a range of fluid levels intermediate said pair of spaced electrodes; said fault condition sensing means including continuous level sensing means for determining the particular fluid level within said predetermined range; said continuous level sensing means including a current tap-off means operatively associated with said first feedback path; said current tap-off means constructed to provide an output signal proportional to the current magnitude flow within said first feedback path and operatively responsive to the instantaneous fluid level within said range.

3. The electrical measuring apparatus of claim 2; said first predetermined condition of fluid presence corresponding to the liquid intermediate said pair of spaced electrodes being below a predetermined level; said second predetermined condition of fluid presence corresponding to the liquid level intermediate said pair of spaced electrodes being at least equal to said predetermined level; said predetermined range corresponding to liquid levels between said predetermined level and a higher level; said continuous level sensing means indicating the instantaneous liquid level within said predetermined range.

4. The electrical measuring apparatus of claim 2; said first predetermined condition of fluid presence corresponding to the liquid intermediate said pair of spaced electrodes being above a predetermined level; said second predetermined condition of fluid presence corresponding to the liquid level intermediate said pair of spaced electrodes being no greater than said predetermined level; said predetermined range corresponding to liquid levels between said predetermined level and a lower level; said continuous level sensing means indicating the instantaneous liquid level within said predetermined range.

5. The electrical measuring apparatus of claim 1, said fault condition sensing means including phase detection means; said phase detection means having a first and second input signal obtained from the input and output terminal regions of said first feedback path respectively; said phase detector means having an output signal operatively related to the phase difference between said first and second input signals; said phase difference of said signal inputs varying responsive to the properties of the fluid at said sensing means.

6. The electrical measuring apparatus of claim 1, wherein said predetermined range of fluid conditions corresponds to the differing characteristics of a plurality of differing fluids at a predetermined level; said fluid condition sensing means providing an output operatively relating to fluid dielectric.

7. The electrical measuring apparatus of claim 1, wherein said predetermined range includes a first and second fluid of differing electrical properties; said amplifier means being in said oscillating condition responsive to either of said first and second fluids being at a predetermined level within said sensing means, and providing said substantially constant amplitude first signals; said fluid condition sensing means second signal differentiating between said first and second fluids.

8. Electrical measuring apparatus comprising, in combination, sensing means adapted to be positioned within a fluid, the presence of which is to be determined; amplifying means including input and output terminals; a first feedback path including said sensing means; a second feedback path; said first and second feedback paths circuit connected intermediate said amplifier output and input terminals to combinedly present oppositely phased feedback signals to said amplifier input terminals; said feedback signals presented by said first and second feedback paths cancelling to present a substantially zero net feedback signal corresponding to a first predetermined condition of fluid presence at said sensing means, whereby said amplifying means will be in a non-oscillating condition; variation of said condition of fluid presence to a second predetermined condition effecting the electrical characteristics of said sensing means to present a net positive feedback signal to said amplifier input terminals, whereby said amplifying means will be in an oscillating condition; said second predetermined condition lying within a predetermined range of fluid conditions; said sensing means comprising a pair of spaced electrodes, a pair of terminal means electrically connected to said pair of spaced electrodes; the presence of air in the volume intermediate said pair of electrodes defining a first impedance condition between said pair of terminals; the presence of a fluid intermediate said pair of electrodes defining a second impedance condition between said pair of terminals; said amplifier means when in said oscillating condition being near its saturation level, thereby providing a substantially constant amplitude source of oscillation responsive to any of a plurality of fluid conditions within said predetermined range; said amplifier means maintaining said substantially constant amplitude source of oscillation responsive to variations of said second condition of fluid presence lying within said predetermined range; fluid condition sensing means for determining the particular fluid condition, within said predetermined range; said fluid condition sensing means operating in conjunction with said oscillating amplifier means, whereby said oscillating amplifier means provides a substantially constant amplitude first signal for indicating the presence of a fluid condition within said predetermined range and said fluid sensing means provides a second signal for indicating the particular fluid condition within said predetermined range; said fault sensing means including phase detector means; said phase detector means having a first and second input signal obtained from the respective ones of said pair of electrode terminals; said phase detector means having an output signal related to the phase difference between said first and second input signals; said phase difference of said signal inputs varying responsive to the properties of the fluid intermediate said pair of electrodes.

9. The electrical measuring apparatus of claim 8, wherein said predetermined range includes a first and second fluid of differing electrical properties; said amplifier means being in said oscillating condition responsive to either of said first of said fluids being at a predetermined level about said pair of electrodes, and providing said substantially constant amplitude first signal; said fluid condition sensing means second signal differentiating between said first and second fluids.

References Cited by the Examiner

UNITED STATES PATENTS

| 2,358,480 | 9/1944 | Skilling | 324—123 |
| 2,852,739 | 9/1958 | Hansen. | |
| 2,934,814 | 5/1960 | Williams et al. | 29—155.5 |
| 2,985,826 | 5/1961 | Fluegel | 324—61 |
| 3,025,465 | 3/1962 | Breen | 324—61 |
| 3,042,908 | 7/1962 | Pearson | 340—244 |
| 3,072,844 | 1/1963 | Doll | 324—61 |

NEIL C. READ, *Primary Examiner.*

D. K. MYER, *Assistant Examiner.*